(No Model.)    J. W. SCHUCKERS.    9 Sheets—Sheet 2.
TYPE WRITING MACHINE.

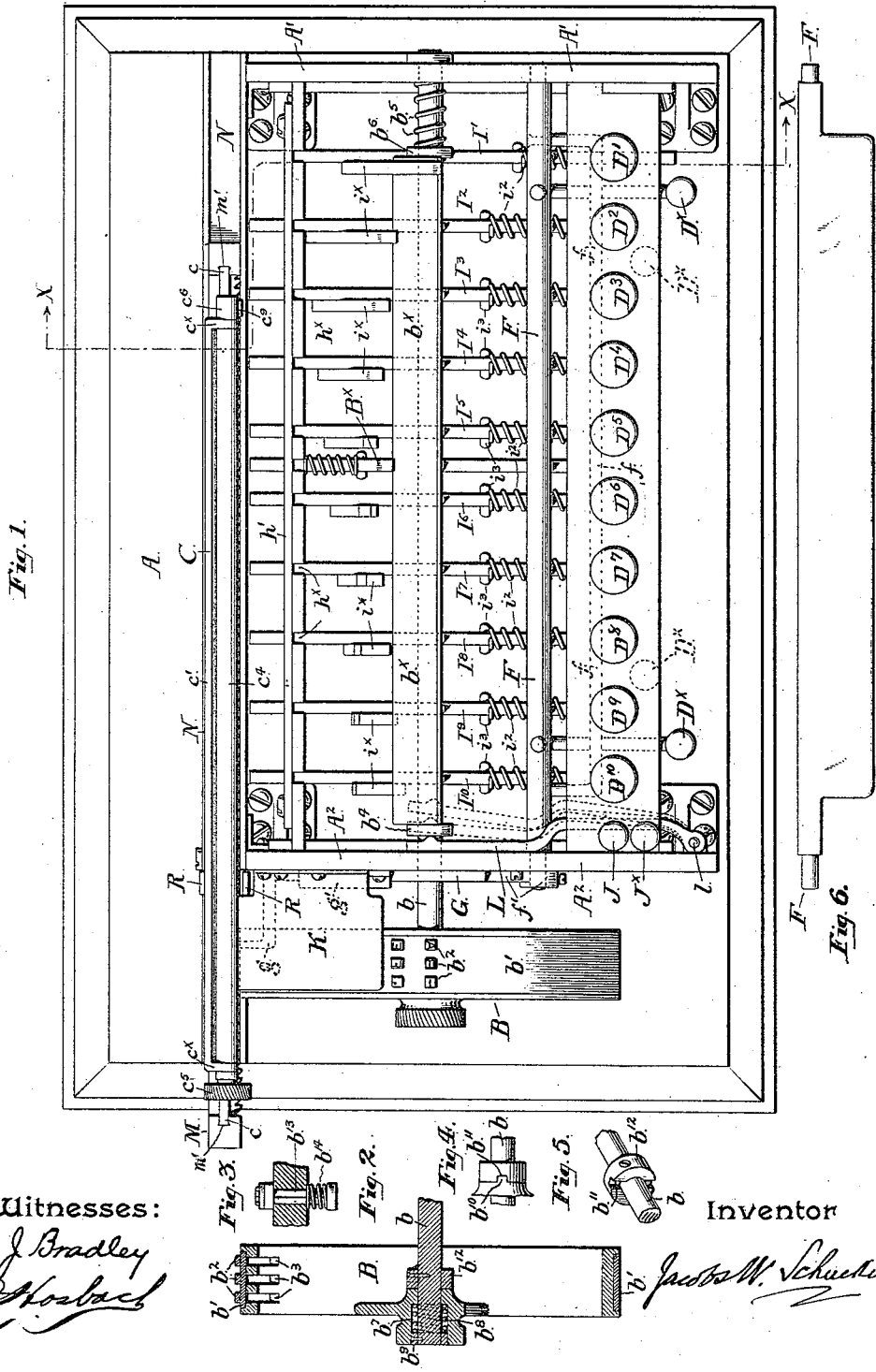

No. 441,197.    Patented Nov. 25, 1890.

Witnesses:
John J. Bradley

Inventor
Jacob W. Schuckers (No Model.)  9 Sheets—Sheet 3.

J. W. SCHUCKERS.
TYPE WRITING MACHINE.

No. 441,197. Patented Nov. 25, 1890.

Witnesses:
John J. Bradley
O. Hosbach

Inventor
Jacob W. Schuckers (No Model.) 9 Sheets—Sheet 4.
J. W. SCHUCKERS.
TYPE WRITING MACHINE.
No. 441,197. Patented Nov. 25, 1890.
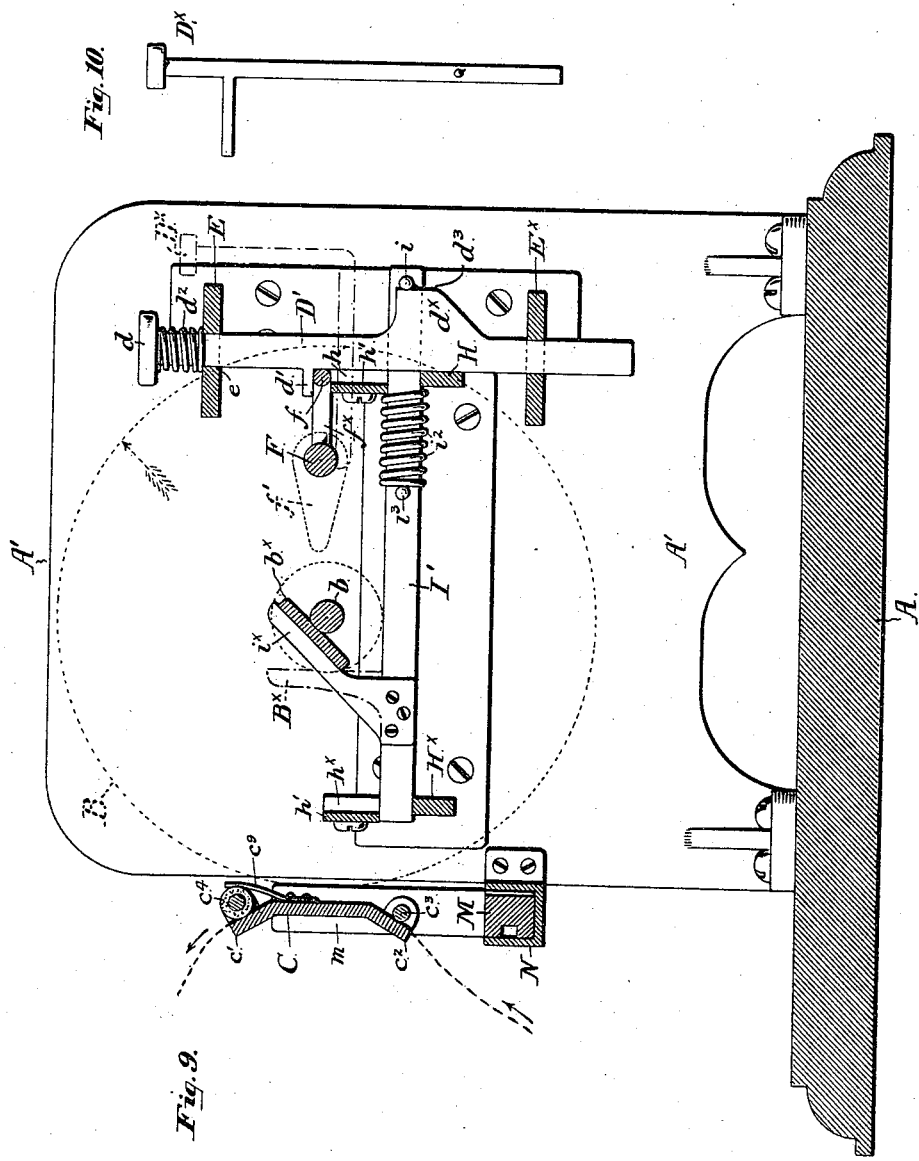
Witnesses:
John J Bradley
Inventor
Jacob W. Schuckers (No Model.) 9 Sheets—Sheet 5.
J. W. SCHUCKERS.
TYPE WRITING MACHINE.
No. 441,197. Patented Nov. 25, 1890.
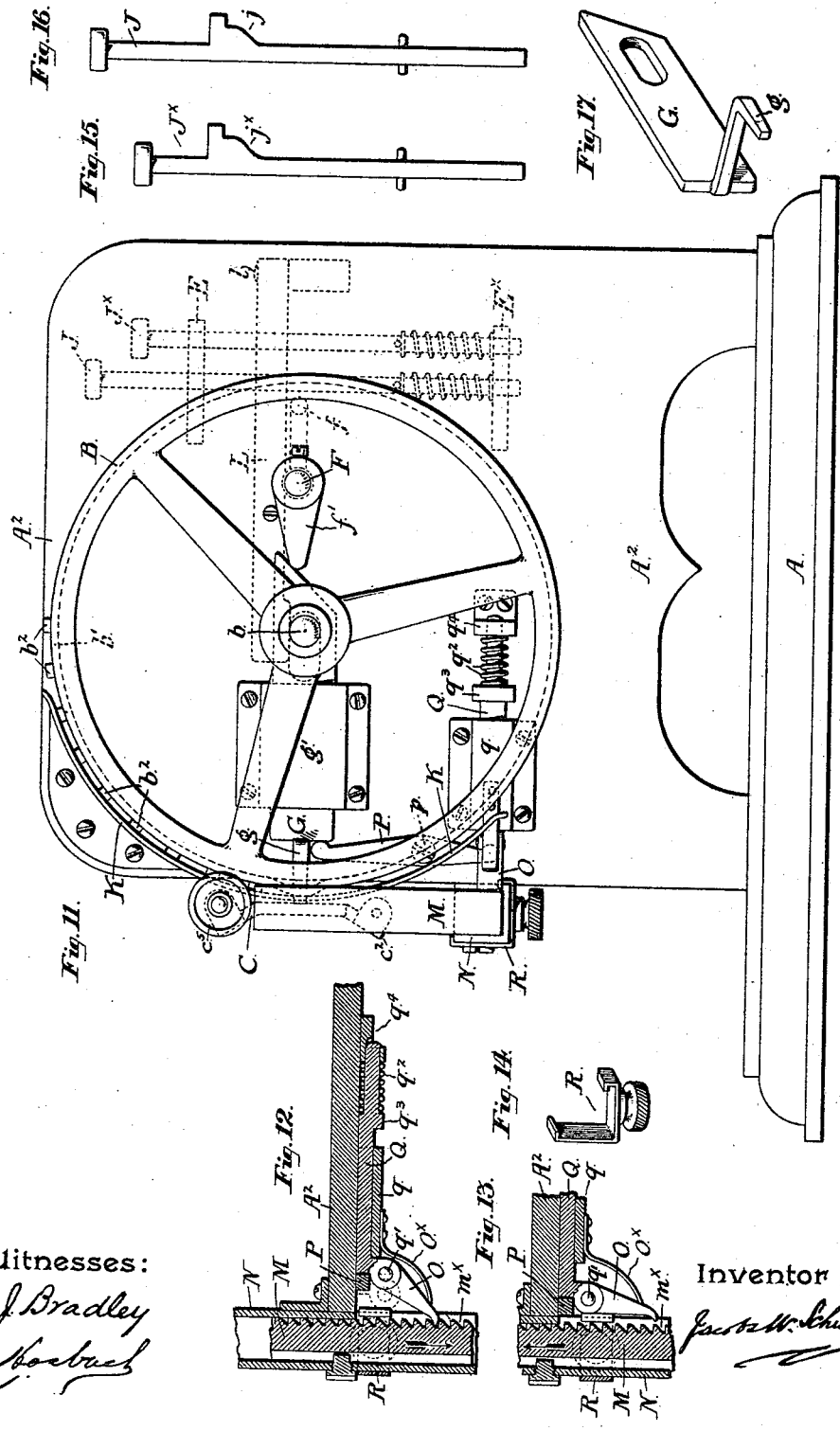
Witnesses:
John J. Bradley
Inventor
Jacob W. Schuckers (No Model.)    J. W. SCHUCKERS.    9 Sheets—Sheet 6.
TYPE WRITING MACHINE.
No. 441,197.    Patented Nov. 25, 1890.
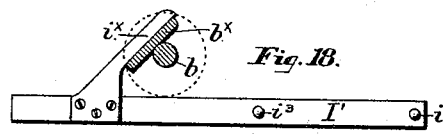
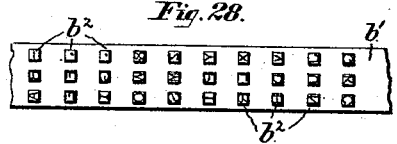
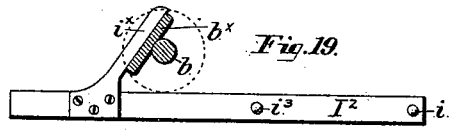
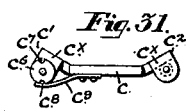
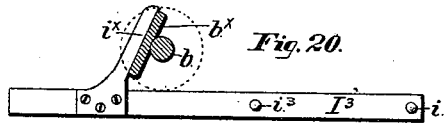
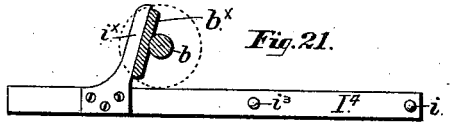
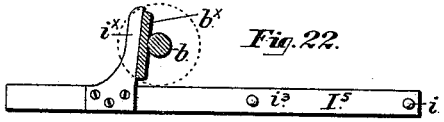
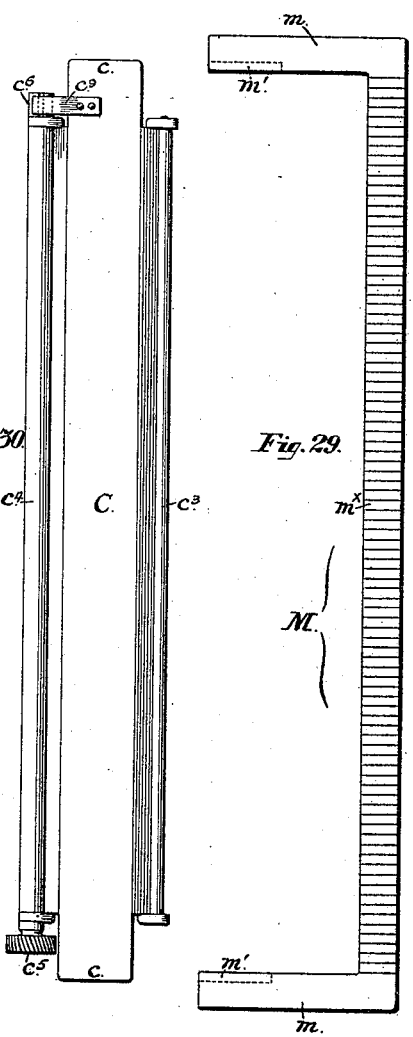
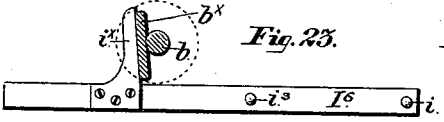
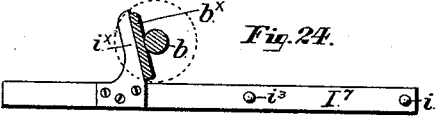
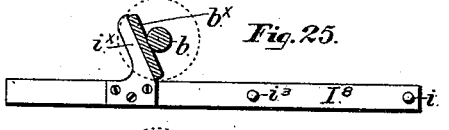
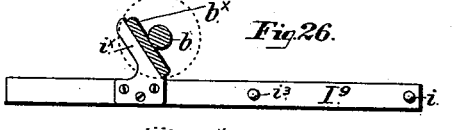
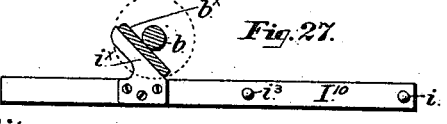
Witnesses:    Inventor
John J. Bradley    Jacob W. Schuckers (No Model.) 9 Sheets—Sheet 7.
J. W. SCHUCKERS.
TYPE WRITING MACHINE.
No. 441,197. Patented Nov. 25, 1890.
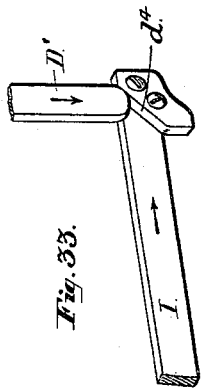
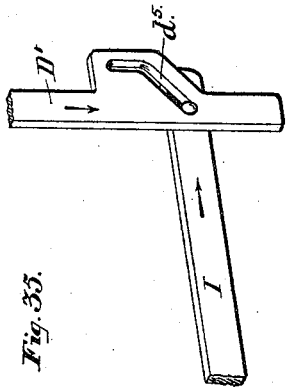
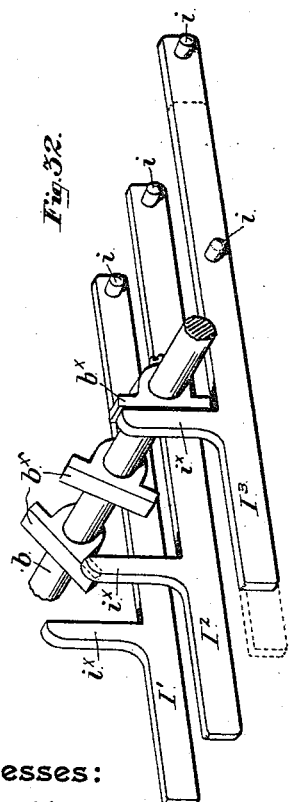
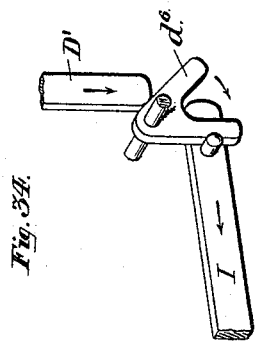
Witnesses:
John J. Bradley
Inventor
Jacob W. Schuckers (No Model.)  9 Sheets—Sheet 8.

J. W. SCHUCKERS.
TYPE WRITING MACHINE.

No. 441,197. Patented Nov. 25, 1890.

Witnesses:
John J. Bradley

Inventor
Jacob W. Schuckers

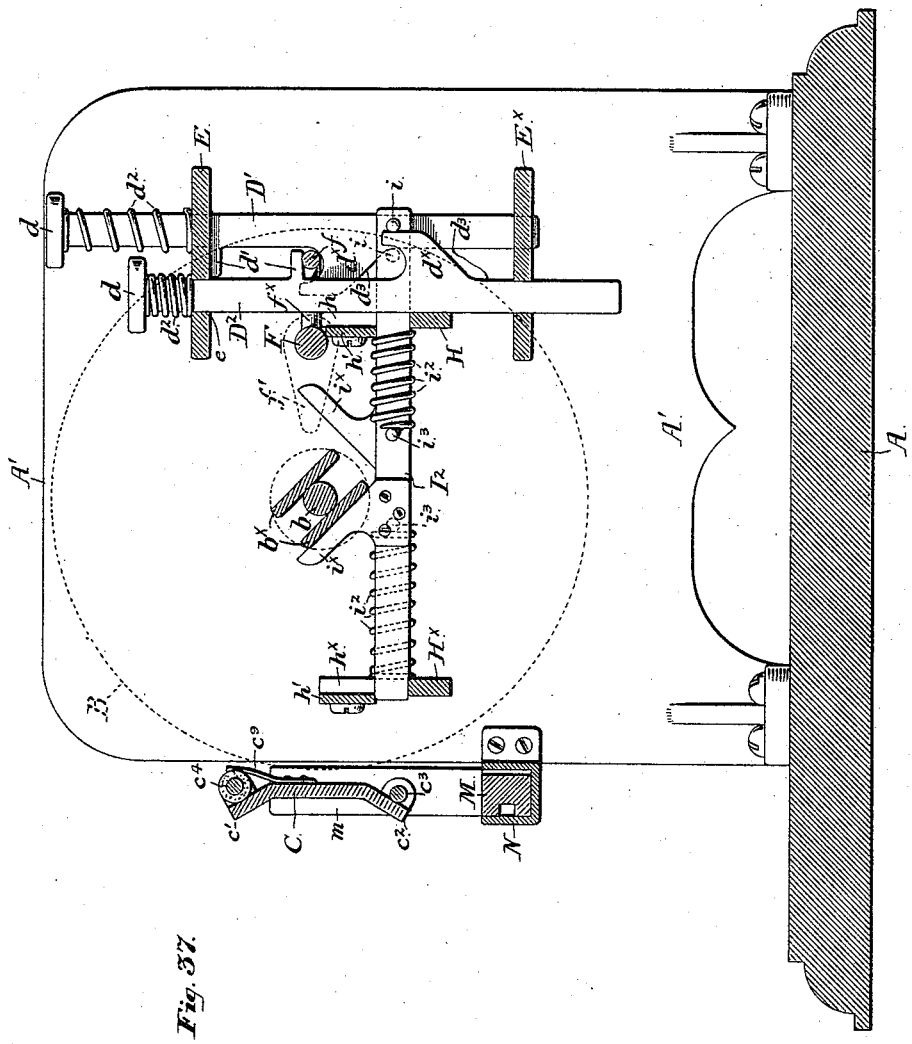

UNITED STATES PATENT OFFICE.

JACOBS W. SCHUCKERS, OF NEWARK, NEW JERSEY, ASSIGNOR TO THE ESSEX TYPEWRITER COMPANY, OF WEST VIRGINIA.

TYPE-WRITING MACHINE.

SPECIFICATION forming part of Letters Patent No. 441,197, dated November 25, 1890.

Application filed May 11, 1889. Serial No. 310,393. (No model.)

*To all whom it may concern:*

Be it known that I, JACOBS W. SCHUCKERS, a citizen of the United States, residing in the city of Newark, county of Essex, and State of New Jersey, have invented certain new and useful Improvements in Type-Writing Machines, of which the following is a specification.

Figure 7:
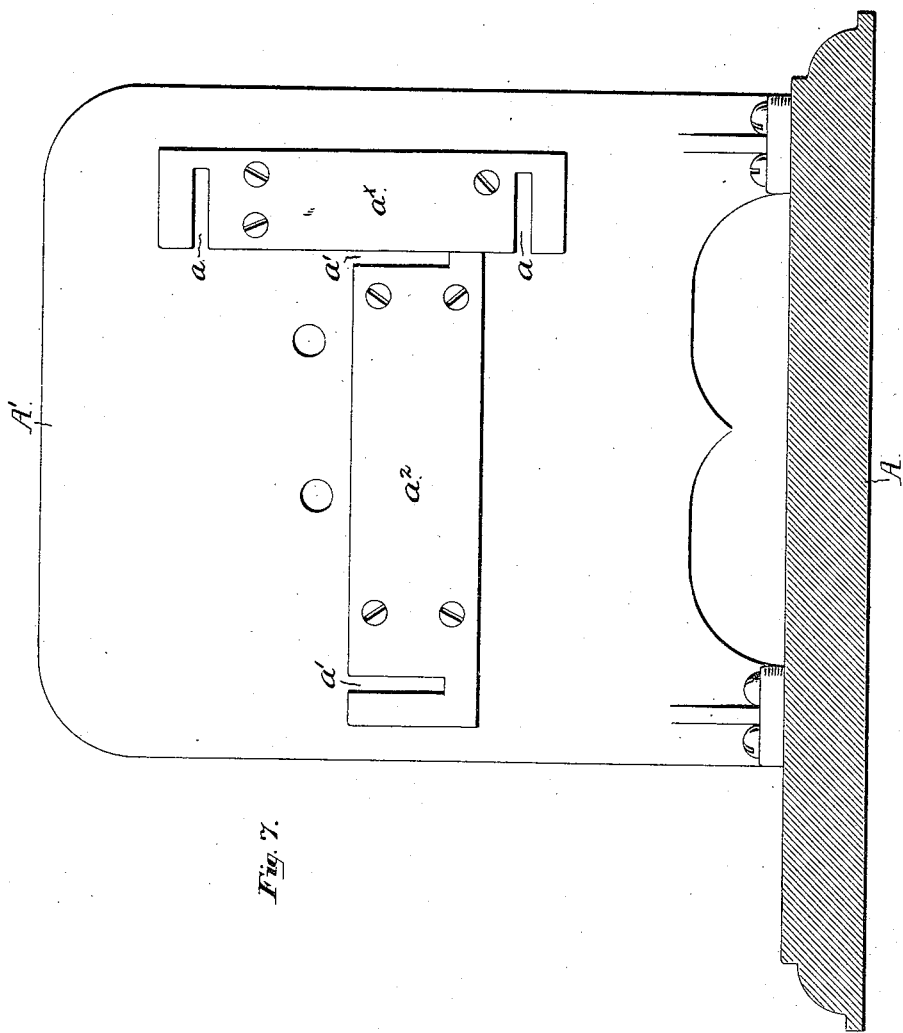
Figure 8:
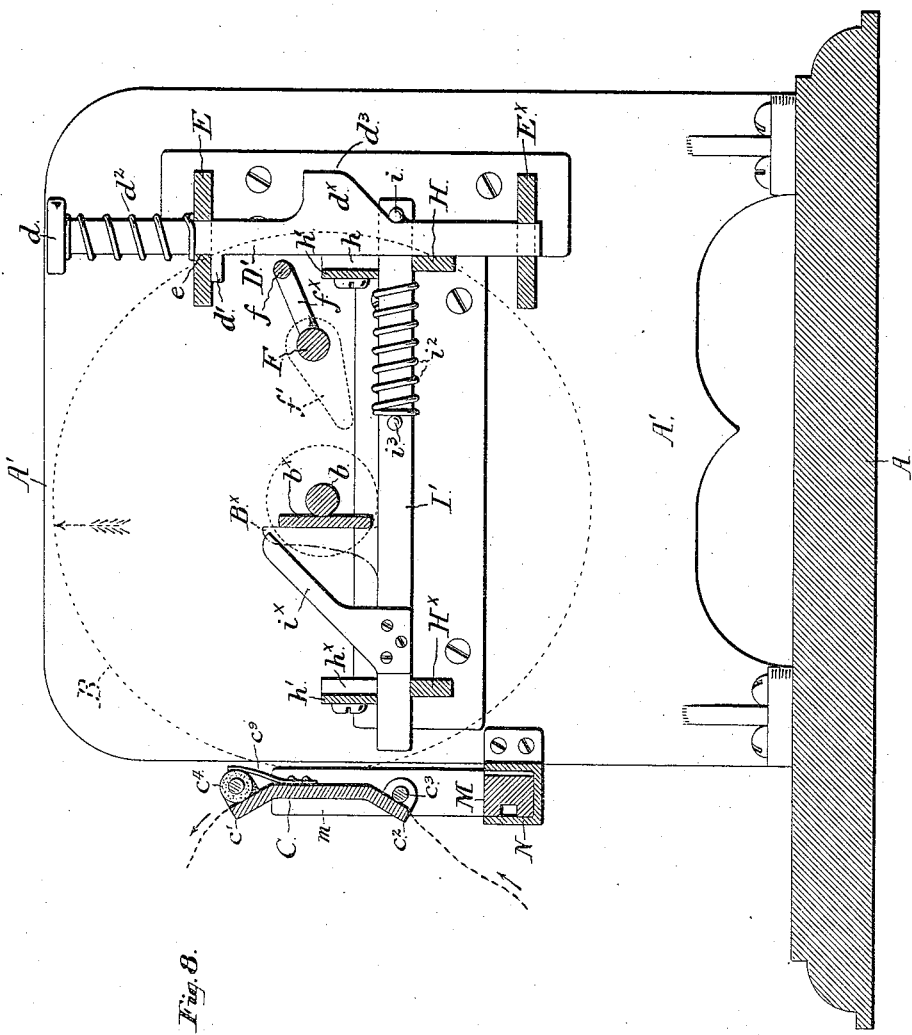
Figure 36:
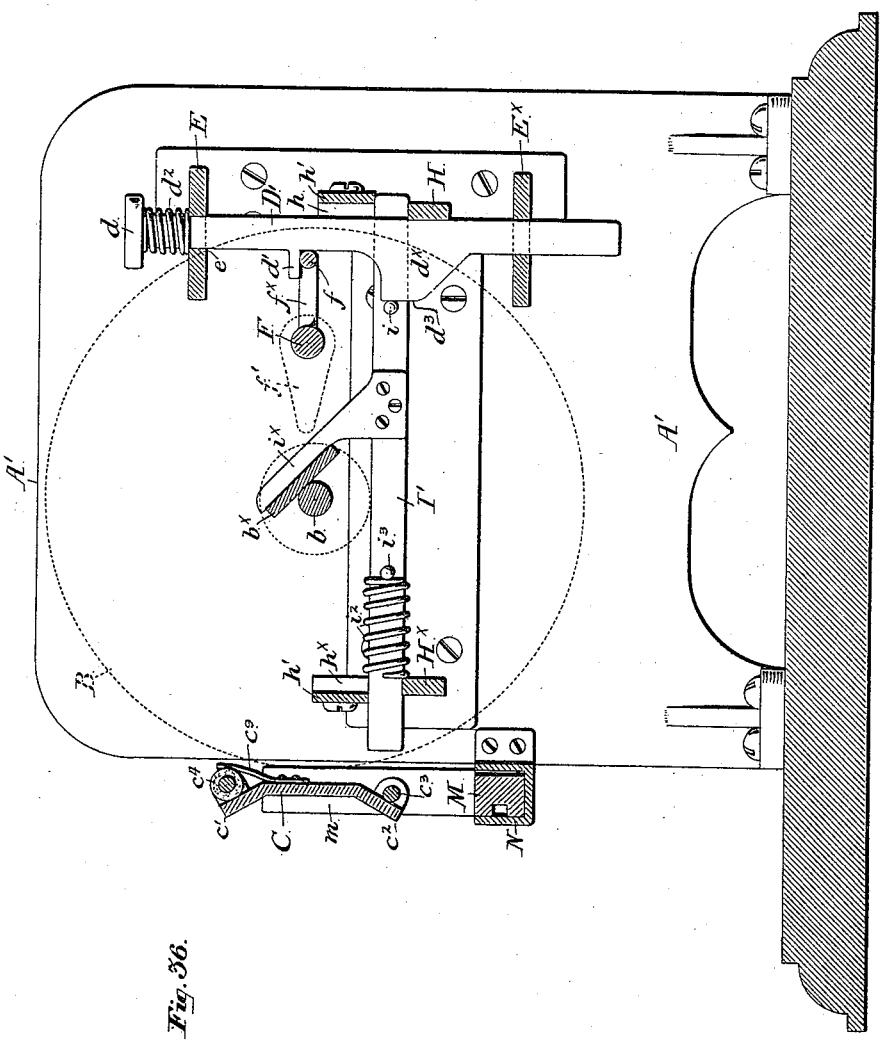

The object of my invention is the production of an inexpensive, simple, and durable type-writing machine; and to such end my invention comprehends certain improved devices and combinations of devices, which together constitute an organized machine of novel character, a good form of a convenient embodiment of which is represented in the accompanying drawings and hereinafter described, the particular subject-matter claimed as novel being hereinafter definitely specified.
In the drawings, Figure 1 is a top plan view of a machine embodying my invention, the first or right-hand end key being shown depressed and its traveler advanced. Fig. 2 is a central vertical sectional elevational detail through a type-wheel of a character to which I resort, illustrative of an application of the types to the rim of the wheel and of the wheel itself to its shaft. Fig. 3 is a fragmentary elevational detail of a type independently applied to the rim of the wheel, the view being illustrative of a modified mode of applying the types to the wheel. Fig. 4 is a fragmentary plan of a form of clutch-connection between the type-wheel and its shaft. Fig. 5 is a perspective detail of the clutch-collar on the wheel-shaft, also shown in Figs. 2 and 3. Fig. 6 is a plan view of a modified form of rocker-rod for the hammer rock-shaft, in which the rod is made in the form of a radial web or plate extending from the shaft. Fig. 7 is an elevation of the inside face of the right-hand end frame-plate as most cheaply constructed and as provided with applied rail-plates. Fig. 8 is a transverse sectional elevational view of the machine represented in Fig. 1 in planes of the dotted lines *x x* upon said figure, and sight being taken in the direction of the arrows upon said lines, the view showing the normal position of rest of the parts represented. Fig. 9 is a view similar to Fig. 8, ex-
cept that instead of showing the position of rest of the parts represented it shows the position of such parts after the depression of the key, the advance of the traveler, the deflection of the wheel-shaft, and the tilting of the hammer rock-shaft. Fig. 10 is an elevational side view of a form of spacing-key which I can at will employ to effect the rocking of the hammer rock-shaft. Fig. 11 is a side elevation of the outside face of the left-hand end frame-plate, showing the type-wheel, the hammer-slide, and type-hammer, the platen-carrier and platen, and suitable devices for occasioning the travel of the platen-carrier. Figs. 12 and 13 are fragmentary sectional plans in a central horizontal plane through the pawl-carrier, base-bar of the platen-carrier, and carrier-way, especially illustrative of the rack-and-pawl connection between the platen-carrier and the pawl-carrier, in Fig. 12 illustrating the position of the pawl during the impression of the type, and in Fig. 13 its position when disengaged from the rack by the pawl-lifter yoke. Fig. 14 is a perspective view of the pawl-lifter yoke. Figs. 15 and 16 are side elevational views of the shaft-keys removed from the frame-work. Fig. 17 is a view in perspective of the hammer-slide and type-hammer, likewise removed from the machine. Figs. 18 to 27, inclusive, are side elevational views of the travelers shown in Fig. 1 removed from the machine, the views being especially designed to illustrate the various different inclinations which the deflecting-arms of the various travelers possess, and also the various inclinations which these arms in consequence impart to the position-plate and type-wheel shaft when they are brought into contact with said plate in the manner shown.
Fig. 28 is an edge outside view of a portion of the rim of the type-wheel shown in Fig. 2. Fig. 29 is a front elevational view of the platen-carrier removed from its ways. Fig. 30 is a similar view of the platen and its tension and feed rollers removed from the platen-carrier. Fig. 31 is a right-hand end elevational view of the platen as shown in Fig. 30. Fig. 32 is a fragmentary perspective detail of a modified construction, in which the wheel-shaft, instead of being provided with a continuous single position-plate the surface of which is a plane and which is common to the deflecting-arms of all of the travelers, is provided with a series of separate or independent position-plates corresponding in number with the number of travelers, each of which plates is affixed to said shaft and the face of each of which is a plane, but which are all set at different angles, and in which the travelers, instead of being provided with deflecting-arms having different inclinations, are provided with deflecting-arms the plate-striking faces of all of which occupy the same angle, preferably a right angle, with respect to the longitudinal axis of the body of the travelers. Fig. 33 is a similar view of a modified construction of key and traveler, in which the key, instead of being provided with a key-cam, is formed as a straight bar, and in which the traveler is provided with a cam-surface, which I for convenience call a "traveler-cam," and which is encountered by the lower extremity of the key. Fig. 34 is a view similar to that of Fig. 33 of a modified construction of key and traveler, between which is interposed a crank-connection through which the thrust of the lower extremity of the key is imparted to a lug upon the traveler. Fig. 35 is a view similar to those of Figs. 33 and 34 of a modified construction of key and traveler, in which the key is provided with a slotted camway, within which is entered a lug upon the traveler, and in which in consequence the movement of the key in either direction serves to occasion the movement of the traveler, the depression of the key occasioning the advance and its elevation the retreat of the traveler. Fig. 36 is a view similar to those of Figs. 8 and 9 of a modified construction of the key and traveler as mounted in the machine, in which the depression of a key occasions the retreat instead of the advance of its traveler. In this construction the key-cams of the keys and the deflecting-arms of the travelers face the rear of the machine, while the traveler-springs are arranged to occasion the advance instead of the retreat of the travelers. Fig. 37 is a view similar to those of Figs. 8, 9, and 36 of a modified construction of machine in which is embodied a double tier or bank of keys, and in which the keys of one of the tiers and the travelers operative in connection therewith are organized as in the construction shown in Figs. 8 and 9, while the keys of the other tier and the travelers operating in connection with them are organized as in the construction shown in Fig. 36.

Similar letters of reference indicate corresponding parts.

Referring now, first, to the constructions especially illustrated in the first thirty-one figures of the drawings, the frame-work of the machine is conveniently composed of a bed or base plate A, from which are erected two parallel transverse end frame-plates $A'$ $A^2$, being standards which serve to support the entire mechanism of the machine. The right-hand frame-plate $A'$ in the construction shown is preferably located at the extreme right-hand end of the bed or base plate A, and the left-hand frame-plate $A^2$ about midway between the center and the left-hand end of said base-plate. The frame-plates, which are preferably counterparts, are preferably also cast webs of the form shown in Fig. 7, screwed or otherwise suitably connected with the base-plate. The two end frame-plates and the base-plate, in conjunction with certain transversely-extending rails hereinafter referred to, preferably constitute the entire frame-work of the machine.

The types $b^2$ of the machine are arranged in circumferential series upon and preferably project from the periphery of a type-wheel B, to which movement of partial rotation in either direction is imparted in order to bring a particular type in front of a platen C, disposed in approximate tangency to said type-wheel. The type-wheel is mounted conveniently but not necessarily to the left side of the left end frame-plate upon the projecting extremity of a shaft, which I term the "wheel-shaft" $b$, which extends longitudinally of the machine in a horizontal plane and has its bearings in the two frame-plates, through both of which it passes. It is obvious that rotary movement imparted to the wheel-shaft will likewise be imparted to the type-wheel which is fixed thereon, and that according to the extent and direction of the said rotary movement of the shaft will be the movement of the wheel. The movement of the shaft and wheel is controlled through intermediate devices by the movement of the type-keys, of which any suitable series are employed, and all of which serve to impart a movement to said shaft and wheel. For the sake of clearer illustration I have, except in Fig. 37, in which a double bank of keys is represented, in the accompanying drawings represented a single bank or tier of but ten keys. It is, however, to be understood that any desired number of such keys are to be employed, and if desired also more than two banks or tiers.

The keys in Fig. 1 are designated by the letters $D'$ to $D^{10}$, inclusive, and as they are all alike a description of one will be sufficient. Selecting, then, the key $D'$, (shown in Figs. 8 and 9,) the key consists of a flat vertically-disposed bar, to which the letter $D'$ is applied, which is a blank of metal of the form shown in the drawings surmounted by a finger-knob $d$, the upper face or pressing-surface of which is provided with a letter, number, or other character correspondent to the type which said key controls, and which is mounted for vertical movement in slots, ways, or bearings $e$, formed, respectively, in an upper and a lower key-rail E $E^x$, which respectively extend in parallel horizontal planes between the frame-plates of the frame-work, with which plates their outer ends are respectively connected. The key-rails are conveniently flat bars or plates of metal pierced at stated intervals by openings, being the ways or bearings $e$ for the keys, which are conveniently connected with the frame-plates by being respectively slipped into slots $a$, formed in rail-plates $a^\times$, respectively secured against the inside faces of said respective frame-plates. If desired, these slots may be formed in or cast upon the frame-plates instead of being formed in rail-plates applied thereto, and of course the key-rails may be applied and secured in many other ways.

Each key is conveniently formed with a cam-surface, being preferably the inclined lower face of a lug formed as a part of the key, which I term the "key-cam" $d^\times$, and which projects from the front face or edge of the key and has a straight vertical upper face $d^3$, and each key is also formed or provided with a lug, which I term the "key-lug" $d'$ projecting from its rear edge or face and serving by abutting beneath the upper key-rail to limit the upward traverse of the key occasioned by the expanding stress of a spiral or other suitable lifting-spring, which I term the "key-spring" $d^2$, and which is interposed between the finger-knob of the key and the upper face of the upper key-rail. The key-lug serves also in the last part of the downward thrust or traverse of the key to encounter and depress a horizontally-extending bail $f$, common to all the keys and springing from a hammer rock-shaft F, journaled in the frame-plates, and the outer left-hand extremity of which is equipped with a rocker-toe $f'$, which imparts the striking impetus to the hammer-slide G, whereof hereinafter. The bail $f$ is conveniently formed as a stiff wire running in parallelism with the hammer rock-shaft and springing from said shaft upon arms. As is apparent, however, the bail may be the outer edge of a plate radiating from and connected with said shaft, as shown in Fig. 6. The depression of any key occasioning the depression of the bail and forward rotation of the rock-shaft will occasion the lift of the rocker-toe, which projects backwardly from said shaft.

It being the office of a key when depressed to occasion, as stated, a given rotation of the wheel-shaft and type-wheel, that rotation is accomplished through the intervention of a preferably horizontally-disposed and transversely-extending slide-bar, which I term a "traveler," and a series of which, correspondent in number with the number of the keys and in the construction represented and under discussion respectively designated I' to I$^{10}$, are employed. These travelers are conveniently housed in slide-bearings in a pair of parallel traveler-rails H and H$^\times$, which extend longitudinally of the machine from frame-plate to frame-plate, the front rail being designated H and the rear rail H$^\times$, and which are conveniently connected with said frame-plates by being dropped into slots $a'$ in rail-plates $a^2$, connected with the inside faces of said frame-plates, but which of course may be otherwise secured. The bearings for the travelers are conveniently formed by vertical slots $h\,h^\times$, of the width of the travelers, which latter are simply dropped into them, retention being effected by keeper-plates $h'$, secured to the rear faces of the respective traveler-rails, as shown in Fig. 1, 8, and 9.

In the mounting of the machine the traveler-rails are respectively disposed at the sides of their respective keys and close thereto.

Referring now to the traveler I', Figs. 8 and 9, it will be observed that it has extension to beyond the front edge of the key, and that beyond said edge it is provided with a cam-lug $i$, which in the normal set of the key, or that shown in Fig. 8, comes into the angle where the inclined face or cam-surface of the key-cam vanishes into the lower shaft portion of the key, and which is therefore in position to be encountered by the cam, with the result that when the key is depressed the traveler is drawn forward from the position which it is shown as occupying in Fig. 8 to that shown in Fig. 9, in which last-named position it will also be observed that a spring $i^2$, coiled about the traveler and abutting between the rear face of the front traveler-rail H and a spring-stop $i^3$, applied to the traveler, has been compressed. Upon the ascent of the key the expansion of the traveler-spring $i^2$ serves to cause the return of the traveler from its advance position, as in Fig. 9, to its retracted or normal position, as in Fig. 8. It will now be understood that the depression of any particular key will cause the advance of the traveler in connection with which said key operates, and that the release and consequent elevation of said key will permit of the retreat of said traveler, which therefore advances when the key is depressed and retreats when the key rises. The advance of the traveler occasions the rotation of the wheel-shaft, and consequently of the type-wheel, by the encounter in the construction under discussion of an angular deflector moving with and preferably formed on or carried by the traveler, with a preferably flat-faced lug, plate, or bar, which I term the "position-plate" $b^\times$, carried by the wheel-shaft, and being in effect a flattened peripheral portion or attachment of said shaft, which is within the range of the movement of said arm, and which in the construction illustrated, or where the shaft is of small diameter, is extended in the form of a tangential plate, so as to present a broad bearing-surface to the face of the deflector, which latter in its aforesaid movement into encounter with said plate turns it until it comes to a close and firm bearing upon said plate, as shown in Fig. 9. The deflectors for rotating the type-wheel are formed, preferably, by providing each traveler with a deflecting arm $i^\times$, the inclination of the plate-striking face of which in the construction under discussion differs from that of every other arm of the series; and, inasmuch as the position-plate extends the length of the wheel-shaft in a given single plane and is common to all the arms, it will be apparent that each arm in encountering and coming to a bearing upon said plate will cause the latter to assume a different angular position, and consequently will cause the wheel-shaft and type-wheel to assume a different position circumferentially considered, and will therefore occasion the presentation of different types upon the periphery of the wheel to the platen. The inclination of the plate-encountering face of each deflecting-arm is intentionally such as in the encounter of a given arm with the position-plate to occasion such an inclination of said plate and such a consequent rotation of the type-wheel as will bring into position opposite the platen the letter, number, or character upon said wheel which corresponds to the letter, number, or character upon the key operating in connection with the given traveler and deflecting-arm.

It is proper to explain that the desired rotations of the wheel-shaft and type-wheel may be accomplished by the retreat instead of by the advance of the travelers by, as shown in Fig. 36, simply reversing the position of the deflecting-arms of the travelers, so that they will face the rear instead of the front of the machine, by correspondingly reversing the set of the position-plate upon the shaft, by reversing the keys, so that their key-cams will face the rear of the machine, and by correspondingly altering the position of the key-lugs upon the travelers, so that the depression of the keys will occasion the retreat instead of the advance of the travelers, in which arrangement, as is obvious and, as shown, equally easy of accomplishment, the traveler-springs must be arranged to occasion the advance instead of the retreat of the travelers. The types preferably extend circumferentially over a segment of from ninety to one hundred and fifty degrees, and therefore but a comparatively short rotation of the wheel will be required to bring any particular type into position, and in consequence therefore the required inclinations of the deflecting-arms will be correspondently small, as will be apparent from an inspection of Figs. 18 to 27 of the drawings, which illustrate the ten travelers and deflecting-arms of the machine of Fig. 1. Of course in practice between the extreme reverse inclinations of the deflecting-arms of Figs. 18 and 27 many other inclinations in addition to those represented in Figs. 19 to 26 may be applied to additional intermediate arms employed.

The positive or advance rotation in either direction of the type-wheel, it will now be understood, is wholly due to the advance of a traveler and the encounter of the deflecting-arm of said traveler with the position-plate of said wheel-shaft. The return of said type-wheel to a given normal set or position of rest with reference to the platen is conveniently accomplished either by loading the wheel or by applying, as shown in dotted lines on Figs. 8 and 9, an automatically-acting spring-advanced shaft-returning plate $B^\times$, the face of which is adapted to encounter and maintain in a predetermined position of rest the position-plate, and the spring of which is weak enough to be overcome by the key-action, or by applying, as shown in Fig. 1, a spiral spring $b^5$ to the wheel-shaft and between a collar thereon and the right-hand frame-plate, which spring may be so torsionally connected to both the collar and the frame-work as to act to recoil the shaft and wheel until either the shaft, the wheel, or the position-plate encounters any desired stop.

It being now understood that the types are brought into position by the advance of a traveler occasioned by the depression of a key, it is proper to further explain that while a projecting key-cam formed on the key and acting against a key-lug on the traveler is a convenient means for causing the downward movement of the key to be converted into the advance movement of the traveler, yet that the same result can manifestly be secured by forming, as shown in Fig. 33, a cam-surface $d^4$ upon the traveler to be encountered by the lower extremity of the key, or by connecting, as shown in Fig. 34, the two devices by a loose crank $d^6$ or other lever-connection. The construction heretofore discussed is, however, a cheap and efficient one for accomplishing the desired result, and in my judgment a cam-connection between the key and the traveler is the most desirable connection. While, moreover, it is desirable to employ a spring to elevate the key-cam, it is apparent that the key-lug on the traveler can, as shown in Fig. 35, be engaged within a cam-groove $d^5$ upon the key, so that whereas the depression of the key will occasion the advance of the traveler, its elevation will likewise occasion the retreat of said traveler without the necessity for the employment of any traveler-spring—a result which would likewise of course be accomplished by a bell-crank connection pivoted to both the key and the traveler.

The type-wheel B is, as stated, provided as to a portion of its peripheral face with radially-projecting types $b^2$, which are caused to make their impress upon the paper or other material upon the face of the platen C by being pressed or forced from within radially outward against the same conveniently by the action of a hammer $g$, connected with the hammer-slide G, hereinbefore referred to, which is set to strike against the back of the type from within or inside of the rim of the wheel and so to force the type struck outwardly and toward the platen. The hammer-slide G is mounted in a slide-bearing $g'$, fixed against the outside face of the left-hand frame-plate. The hammer $g$ is, as shown in the drawings, connected with the rear extremity of said slide, while the front extremity of the slide is formed with a cam-surface, against which impinges the rocker-toe $f'$ on the hammer rock-shaft whenever said shaft is rocked by the encounter of a key-lug $d'$ with its bail, as hereinbefore set forth. The normal set of the hammer and hammer-slide is such that the hammer is normally back from the inside face of the rim of the wheel, such position being conveniently effected by a retracting-spring of any preferred character, but being preferably effected by the platen-actuating devices hereinafter referred to.

As will be understood from a consideration of Figs. 8 and 9, the hammer rock-shaft is not rotated and the hammer-slide consequently not advanced until after a traveler has been advanced to the extent of its forward movement and has in consequence effectuated a given desired rotation of the type-wheel. From this relationship of parts there necessarily results the bringing of a particular type into position with respect to the platen before the striking of such type to make its impress.

In order that the types may be susceptible of a radially in-and-out movement with respect to their carrying type-wheel, many modes of mounting or attaching them may be resorted to. I find it convenient to form upon or apply to the external or peripheral face of the type-wheel a band of rubber $b'$, out of the substance of which are formed or to which are applied types $b^2$, and to form one or more circumferential openings or slots, which I term "hammer-slots," $b^3$ entirely through the rim of the wheel, so as to expose from within the said rim the back or under face of said type-carrying band. Through the slot or slots so formed the striking extremity of the hammer in the forward movement of said hammer passes and comes in contact with the rear face of said type-band, with the result of forcing the portion of the band encountered and the type which that portion of the band carries forward against the platen. Upon the retraction of the hammer the band, which under its impulse was bellied out by virtue of its own elasticity, resumes its normal set. Of course, if desired, each type may, as shown in Fig. 3, be provided with a shank $b^{13}$, mounted in a suitable radial bearing in the rim of the wheel, and be controlled by a spring $b^{14}$, which will yield under the blow of the hammer to permit of the advance of its controlled type, but after the retreat of the hammer will cause said type to reassume its normal position.

In the application of the type-carrying rubber band, as represented in Fig. 2 of the drawings, I have illustrated three parallel circumferential rows of types and three hammer-slots, in circumferential alignment with which said rows of types are respectively disposed, and in connection with such arrangement have illustrated but a single hammer adapted to do duty in connection with the types of all three rows, and this adaptability I secure by mounting the wheel-shaft in such manner as to permit of its being moved endwise, and in consequence of its imparting a similar endwise (or, more properly, sidewise) movement to the type-wheel, such as to bring either of the two hammer-slots other than that which in the normal set of the wheel and shaft presents to the hammer in range for presentation with respect to said hammer. This endwise movement of the wheel-shaft and type-wheel may conveniently be accomplished by many contrivances. I prefer to employ two shifting-keys J J$^\times$, mounted in the key-bank, each provided with a cam-surface $j$ $j^\times$, and respectively as to their respective cam-surfaces adapted to engage against the side face of a lever L, fulcrumed at $l$ and bearing against a lever-collar $b^4$ upon said shaft. It is obvious that the depression of either of these shifting-keys will, through the lateral deflection of the shaft-lever, (in connection with which both keys operate,) occasion the right-hand endwise movement of the wheel-shaft, and that such movement will be accompanied by the compression of the shaft-spring $b^5$, which is coiled about the shaft between, for instance, the right-hand frame-plate and the collar $b^6$ upon said shaft. It is further obvious that upon the release and ascent of the depressed shifting-key the shaft-spring will occasion the return of the shaft and type-wheel to their previous position, the incidental return of the lever with the shaft occasioning the elevation of the shifting-key—an action, however, that may be either aided or, in fact, wholly performed by a lifting-spring applied to the key, as shown in dotted lines in Fig. 11. It is apparent that according to the fulcrumage of the respective levers or the inclination of the respective cam-surfaces of the shifting-keys will be the movement which said keys will respectively impart to the shaft and type-wheel. In the construction represented one of the keys brings the second hammer-slot of the type-wheel in range of the hammer, while the other key brings the third slot in range of said hammer, the first slot being normally in range.

The foregoing arrangement of a series of parallel circumferential rows of types upon the face of the type-wheel is one of convenience merely, and one which enables me to compress within the compass of a short arc of the type-wheel a large number of types. Of course, if desired, more or less than three rows of types may be employed, and, obviously, a single row will effectuate the invention, although it will necessitate long rotary throws of the type-wheel.

In order, if desired, to provide the type-wheel with alphabets of different fonts of type, it is easy to divide the circumference of said wheel into two, three, or more segments, each of which shall contain an alphabet of a given font, style, or character of type, and so apply the wheel that it can be adjusted with respect to its circumferential set upon its shaft. Such an adjustment may easily be effected by the contrivance shown in Figs. 2, 4, and 5, in which the hub of the type-wheel is formed with a socket $b^7$ of such dimensions as to provide an annular interspace about the extremity of the shaft, within which interspace is applied a spiral spring $b^8$, abutting between the outer face of said socket and a collar or lug $b^9$ upon the extremity of the shaft. It is obvious that by this arrangement the wheel can be either slid outwardly endwise upon the shaft up to the range of compression of the spring or be rotated with respect to said shaft. The inner face of the hub is provided with a tongue $b^{10}$, adapted to a groove $b^{11}$ in a clutch-collar $b^{12}$, fixed upon the shaft, and by this contrivance, which is in the nature of a clutch, in connection with the spiral spring-and-socket arrangement above described, it is obvious that the type-wheel can be rotated with respect to the shaft to which it is applied and be fixed in two different positions. Of course, by applying a series of grooves in the clutch-collar a series of adjustments can be made. Manifestly, however, the foregoing is but one of many contrivances by which it is possible to adjust the set of the type-wheel with reference to its carrying and actuating shaft.

K, Figs. 1 and 11, is a segmental inking-pad so set that in the rotative movement of the type-wheel it serves to supply ink to the faces of the types. It is supported as convenience of construction may dictate, preferably from the left-hand frame-plate, as shown in the figures mentioned. The pad is of course either made in two parts or provided with a transverse slot or opening in the region facing the platen, so as not to interfere with the printing action of the types. It is manifest that the pad K is, moreover, simply one of many contrivances which may be employed for inking the types, and that it is equally possible to ink them by rollers or other well-known devices, and also possible and even preferable to dispense with all such devices and employ an inking-ribbon, as commonly used in writing-machines.

Having now explained the devices by which the types are selected and brought into action against the platen, it is proper to explain that in connection with them platens of various character and actuated to the requisite movement by various contrivances may be employed. As convenient for the purpose I have devised the following contrivances:

M is what I term the "platen-carrier," the same being composed of a base-bar of preferably rectangular cross-section, to which the letter M is applied, having upright end arms $m$, and which is mounted for longitudinal travel in either direction in a carrier-way N, which is a gutter-shaped device corresponding cross-sectionally to the form of the base-bar of the platen-carrier and fixed longitudinally of the machine conveniently by being connected with the frame-plates, as shown in Figs. 1, 8, and 9. The base-bar of the platen-carrier has upon its front face a rack $m^x$, and its arms $m$ are each provided with a vertical slot $m'$, to which are respectively adapted the respective extremities $c\ c$ of the platen C, so that said platen can be easily dropped into its carrier in such manner as to become temporarily a part thereof or be easily lifted from out it. The longitudinal predetermined travel of the platen-carrier and platen is occasioned by the action of an intermittently-operated pawl O, hereinafter described. The platen is preferably provided with angular top and bottom edges $c'\ c^2$, between which and its face (designated by the letter C) is a flat surface, against which the paper or other writing material lies flat, and which receives the thrust or stroke of the types. The extremities of the top and bottom edges of the platen are inturned to form or otherwise conveniently provided with lugs or ears $c^x$, which respectively, by being perforated, serve as the journal-bearings for a tension-roller $c^3$, applied between the ears of the bottom edge of the platen, and for a feed-roller $c^4$, applied between the ears of the top edge of the platen and conveniently provided with a thumb-knob $c^5$, by the manual rotation of which it (the said feed-roller) is rotated in order to occasion the feed of the paper upon the platen transversely across the face of said platen. Both the tension-roller and the feed-roller bear closely against the respective edges of the platen and serve to maintain the surface of the paper taut against the face of said platen. The feed-roller is conveniently rubber-faced, so as to insure the requisite bite upon the paper.

In order to gage the transverse feed of the paper across the platen, I find it convenient to provide the extremity of the feed-roller opposite to that which carries the thumb-knob $c^5$ with a guttered gage-disk $c^6$, the gutters $c^7$ of which are simply peripheral notches employed in any desired series, into which successively enters and engages a lug $c^8$ on the extremity of a feed-roller spring $c^9$, secured, as shown in Figs. 30 and 31, to the platen.

It is obvious that the foregoing contrivance will automatically serve to guide the touch of the operator in his manual rotation of the feed-roller, and thereby conveniently and accurately secure a predetermined advance of the paper.

As already stated, the longitudinal intermittent travel of the platen and platen-carrier (in the arrangement represented from the right to the left hand of the machine) is conveniently secured by the action of a pawl against the rack-provided face of the base of the platen-carrier. The pawl may be actuated by many contrivances, and is preferably actuated direct from the type-keys conveniently by the following connective mechanism intermediate between it and said keys.

P is the pawl-lever, a lever of the first order, vertically erected conveniently against the outside face of the left-hand frame-plate upon a horizontal pivot $p$, and as to its upper extremity bearing against the rear edge of, or pivotally or otherwise suitably connected with, the hammer-slide, so as to be deflected toward the rear of the machine in the advance of said slide in its type-striking movement. The lower extremity of said lever bears against the rear portion of, or is pivotally or otherwise connected with, a pawl-carrier Q, the same being a slide-bar housed for endwise movement, preferably in a horizontal plane and from front to rear of the machine, in a slide-bearing $q$, conveniently affixed to the outside face of the left-hand frame-plate. To the rear portion of this pawl-carrier is by a vertical pivot $q'$ pivoted the platen-pawl O, which is held to duty against the face of the rack $m^x$ by a pawl-spring $O^x$, which is conveniently affixed at its front extremity to the slide-bearing $q$ of the pawl-carrier, and which as to its rear extremity exerts its influence against the back face of the pawl. The front portion of said carrier is conveniently encircled by a carrier-spring $q^2$, which abuts between a shoulder $q^3$ on the carrier and a resisting abutment $q^4$ on the frame-plate. It will now be obvious that when the hammer-slide is under the action of the rocker-toe advanced to occasion the striking of a type the upper extremity of the pawl-lever will be deflected toward the back of the machine and the lower extremity toward the front of the machine in such manner as to occasion the backward movement of the pawl-carrier, the compression of the carrier-spring, and the slipping of the platen-pawl from the rack-tooth with which it was last engaged to the next adjoining rack-tooth (or the next but one, as may be desired) toward the right-hand end of the platen-carrier, and that, therefore, during the period of the impressing of the type upon the paper the platen-carrier will be at rest and the platen-pawl slipping to its position of engagement necessary for the next subsequent advance of the platen-carrier and platen to the left. It is also obvious that upon the drop or redeflection of the rocker-toe in the ascent of the key the recoil or expansion of the spring of the pawl-carrier will cause the advance of the pawl-carrier, and will, through the intervention of the platen-pawl, cause the consequent left-hand advance of the platen-carrier and platen, the redeflection of the pawl-lever, and the consequent retreat of the hammer-slide and hammer. In the foregoing action the pawl-spring, which simply serves to hold the platen-pawl to duty against the rack, will, in the retreat of the pawl-carrier, yield sufficiently to permit of the slipping of the pawl.

From a consideration of the foregoing mechanism it will be apparent that each stroke or depression of a key is accompanied by a predetermined longitudinal advance of the platen, and consequently by a predetermined longitudinal feed of the paper transversely across the type-face of the type-wheel. When the platen-carrier and platen have completed their longitudinal travel to the left-hand, their return to their normal right-hand position is conveniently effected by hand, the platen-pawl being first released from engagement with the platen-carrier rack by the manual or other sliding of a pawl-lifter yoke R, Figs. 12, 13, and 14, clamped about but free to slide endwise with respect to the carrier-way N of the platen-carrier from the position which said lifter-yoke is shown as occupying in Fig. 12, in which position it is without effect upon the pawl, to that which it is shown as occupying in Fig. 13, in which position it effectually blocks the encounter of the pawl with the rack. Of course, if desired, other means than the foregoing for maintaining the pawl out of engagement with the rack and for returning the platen and platen-carrier may be resorted to.

In order to effect spacing, I preferably resort to a spacing-key $D^x$, (shown in Figs. 1 and 9,) applied to and horizontally projecting from the hammer-rock-shaft, and which serves, therefore, simply to occasion through the hammer-slide, the pawl-lever, and connections the necessary predetermined advance of the platen-carrier and platen. Of course the depression of this key necessarily occasions the advance of the hammer; but the type-wheel being during the depression of the key at its normal position of rest is constructed either to then present to the hammer a portion of its type-carrying band which is unprovided with a type, and the outward radial thrust of which portion is consequently without effect upon the paper, or to present to said hammer simply an opening through its rim not covered by said band.

The operation of a machine embodying the foregoing construction will now from the preceding description of that construction be sufficiently understood.

Referring then, secondly, to the constructions especially illustrated in Figs. 32 to 37, inclusive, of the drawings, I have in Fig. 32 represented a modified construction, in which the wheel-shaft, instead of being provided with a continuous single position-plate the surface of which is a plane and which is common to the variously-inclined deflecting-arms of all of the travelers, is provided with a series of separate or independent position-plates corresponding in number with the number of the travelers, each of which plates is affixed to said shaft, and the face of each of which is, preferably, a plane, but which are all set at different angles, and in which the travelers, instead of being provided with deflecting-arms having different inclinations, are provided with deflecting-arms the plate-striking faces of all of which occupy the same angle, preferably a right angle, with respect to the longitudinal axis of the body of the travelers. It will be readily perceived that this modified construction is the mechanical equivalent for that already discussed, as it is obvious that it matters not to the ultimate result whether the rotary movements imparted to the wheel-shaft be imparted by the encounter of uniformly-angled deflecting-arms on the travelers with variously-angled position-plates upon the shaft or by the encounter of variously-inclined deflecting-arms upon the travelers with a uniformly-inclined or common position-plate upon the shaft.

It is proper to state that I do not in this application claim or seek to cover a type-wheel shaft provided with a series of separate or independent position-plates each of which is affixed to the shaft and the face of each of which is preferably a plane, but which are all set at different angles, as a type-wheel shaft of the said construction, but directly operative in connection with a series of keys without the intervention of travelers, constitutes a portion of a form of type-writing machine in some particulars kindred to that of this application, which forms the subject-matter of my application No. 316,308, filed July 2, 1889.

The modified constructions illustrative of different forms of connection between the type-keys and the travelers, which form the subjects of Figs. 33, 34, and 35, have already been sufficiently referred to.

In Fig. 36 I have illustrated another obvious modification of the machine, in which the depression of a key occasions the retreat instead of the advance of its traveler, and yet by such retreat occasions the operation of the type-wheel. The nature of the modification is so obvious from an inspection of the figure in question that it is superfluous to enlarge upon it. Suffice it to say that the modification consists, essentially, in reversing the key, so as to cause its key-cam to face backward, in applying the deflecting-arm to the traveler so that it also will face backward, in applying the position-plate to the front rather than to the rear face of the wheel-shaft, and in applying the traveler-spring so as to occasion the advance instead of the retreat of the traveler. In this connection it is perhaps proper to mention the fact that the wheel-shaft instead of being housed above the travelers may be housed below them, in which case the deflecting-arms will depend from the travelers instead of springing upwardly from them, and this whether the rotation of the wheel-shaft be occasioned by the advance or by the retreat of the traveler. I have deemed this modification too obvious and easily understood to require special illustration.

In Fig. 37 I have represented a modified construction of machine in which is embodied a double tier or bank of keys, and in which the keys of one of the tiers or banks and the travelers operative in connection therewith are organized as in the construction shown in Figs. 8 and 9 and effectuate the rotation of the wheel-shaft and type-wheel by the advance of the travelers, while the keys of the other tier or bank and the travelers operative in connection therewith are organized as in the construction represented in Fig. 36 and effectuate the rotation of the wheel-shaft and type-wheel by the retreat instead of by the advance of the travelers. This construction necessitates the employment either of a very thick position-plate the sides of which are of course parallel and the thickness of which is equal to the diameter of the shaft, or else, as shown in the drawings, of two parallel position-plates.

The other modifications beyond those already referred to are in the domain of workshop expediency and skill, and require no description. Whatever be the arrangement of keys and travelers resorted to, it is preferable to arrange the keys in a double bank, staggering or alternating them by keys of the respective banks, and making the keys of the front bank slightly lower than those of the rear—an arrangement easily accomplished by shortening the upper portion of the key above the key-cam.

It will be understood that by the application of the shaft-keys already referred to it is possible to cause a given key to do duty for the same letter in upper and lower case or for given letters and given punctuation-marks or numerals. Expedients of this character are obvious to those skilled in this class of machine. It is likewise apparent that changes in the detail and arrangement of mechanical construction of intermediate or connective mechanism and of minor parts can be resorted to without departure from the invention broadly as such and as I have endeavored to explain it. Thus, for instance, the type-wheel and the type-striking and platen-actuating mechanisms may be applied at the right-hand instead of at the left-hand side of the machine and the platen be arranged at the commencement of the operation of writing to project beyond the right-hand side of the machine and to travel toward the left until it has swept past the face of the wheel. Thus, also, the type-striking and platen-actuating mechanism may, according to the set of the type-wheel, be applied to the inside instead of to the outside of either frame-plate, while, as is also apparent, a paper carrying and supporting cage or rack may be connected with the platen-carrier to insure the support of the paper.

Having thus described my invention, I claim—

1. In a type-writing machine, the combination of a key, a sliding traveler operated by the movement of said key, a deflector moving with said traveler, a shaft within the range of the movement of and adapted to be turned by said deflector, and a type-wheel carried by said shaft, substantially as described.

2. In a type-writing machine, the combination of a key, a sliding traveler operated by the movement of said key, a deflector moving with said traveler, a shaft within the range of the movement of and adapted to be turned by said deflector, a type-wheel carried by said shaft, and means for returning the shaft and type-wheel to their normal positions, substantially as described.

3. In a type-writing machine, the combination of a key, a sliding traveler operated by the movement of said key, a deflecting-arm on said traveler, a shaft within the range of the movement of and adapted to be turned by said deflecting-arm, and a type-wheel carried by said shaft, substantially as described.

4. In a type-writing machine, the combination of a key, a sliding traveler operated by the movement of said key, a deflector moving with said traveler, a shaft provided with a position-plate adapted to be engaged by the deflector on both sides of the axis of the shaft, and a type-wheel carried by said shaft, substantially as described.

5. In a type-writing machine, the combination of a key, a traveler operated by the movement of the key, a deflector moving with said traveler, a shaft within the range of the movement of and adapted to be turned by said deflector, a type-wheel carried by said shaft, and mechanism operated by the movement of the key for producing the impression without movement of the type-wheel, substantially as described.

6. In a type-writing machine, the combination of a key, a traveler operated by the movement of the key, a deflector moving with said traveler, a shaft within the range of the movement of and adapted to be turned by said deflector, a type-wheel carried by said shaft, and a hammer operated by the movement of the key, substantially as described.

7. In a type-writing machine, the combination, with a type-wheel and its shaft, of a deflector within the range of movement of which the shaft is located and by which it is adapted to be turned, a traveler with which said deflector moves, and a key engaging and operating said traveler by a cam-surface, substantially as described.

8. In a type-writing machine, the combination, with the type-wheel and its shaft, of a deflector within the range of movement of which the shaft is located and by which it is adapted to be turned, a traveler with which said deflector moves, a key engaging and operating the traveler through a cam having an extended straight face, and an impression mechanism operated by the further movement of the key after the type-wheel is positioned by the movement of the traveler, substantially as described.

9. In a type-writing machine, the combination, with the type-wheel and its shaft, of a deflector within the range of movement of which the shaft is located and by which it is adapted to be turned, a traveler carrying said deflector, a key provided with a cam engaging and operating the traveler and having an extended straight face, and an impression mechanism operated by the further movement of the key after the type-wheel is positioned by the movement of the traveler, substantially as described.

10. In a type-writing machine, the combination, with the type-wheel and its shaft, the shaft being provided with a position-plate, of a deflector adapted to engage the position-plate on both sides of the axis of the shaft, a sliding traveler carrying said deflector, a key engaging and operating said traveler by a cam having an extended straight face, and an impression mechanism operated by the further movement of the key after the type-wheel is positioned by the movement of the traveler, substantially as described.

11. In a type-writing machine, the combination of a series of keys, a corresponding series of sliding travelers operated by the movement of the keys, deflectors moving with the travelers, a shaft within the range of the movement of all of the deflectors and adapted to be turned through varying arcs by the different deflectors, and a type-wheel carried by said shaft, substantially as described.

12. In a type-writing machine, the combination of a series of keys, a corresponding series of sliding travelers operated by the movement of the keys, deflectors moving with the travelers, a shaft within the range of the movement of and adapted to be turned by each of the deflectors, the engaging-surfaces of the shaft and different deflectors varying in inclination, and a type-wheel carried by said shaft, substantially as described.

13. In a type-writing machine, the combination of a series of keys, a corresponding series of sliding travelers operated by the movement of the keys, deflectors of varying inclination moving with said travelers, a shaft within the range of the movement of and adapted to be turned by each of said deflectors, and a type-wheel carried by said shaft, substantially as described.

14. In a type-writing machine, the combination of a series of keys, a corresponding series of travelers operated by the movement of the keys, deflectors of varying inclinations moving with said travelers, a shaft within the range of the movement of and adapted to be turned by each of said deflectors, a type-wheel carried by said shaft, and mechanism operated by the movement of any one of the keys for producing the impression without movement of the type-wheel, substantially as described.

15. In a type-writing machine, the combination of a series of keys, a corresponding series of travelers operated by the movement of the keys, deflectors of varying inclinations moving with said travelers, a shaft within the range of the movement of and adapted to be turned by each of said deflectors, a type-wheel carried by said shaft and having movable types, a type-hammer, a platen and platen-carrier, and mechanism whereby the movement of any one of the keys operates the type-hammer and advances the platen-carrier, substantially as described.

16. In a type-writing machine, the combination of a series of keys, a corresponding series of travelers operated by the movement of the keys, deflectors of varying inclinations moving with said travelers, a shaft within the range of the movement of and adapted to be turned by each of said deflectors, a type-wheel carried by said shaft and having movable types, a type-hammer operated by the movement of any one of said keys, a platen and platen-carrier, and mechanism operated by said hammer for advancing the platen-carrier, substantially as described.

17. In a type-writing machine, the combination of a series of keys, a corresponding series of travelers operated by the movement of the keys, deflectors of varying inclinations moving with said travelers, a shaft within the range of the movement of and adapted to be turned by each of said deflectors, a type-wheel carried by said shaft, a hammer rock-shaft adapted to be rocked by each of said type-keys, and a type-hammer operated by the movement of the hammer rock-shaft, substantially as described.

18. In a type-writing machine, the combination of a series of keys, a corresponding series of travelers operated by the movement of the keys, deflectors of varying inclinations moving with said travelers, a shaft within the range of the movement of and adapted to be turned by each of said deflectors, a type-wheel carried by said shaft and having movable types, a hammer rock-shaft adapted to be rocked by each of said keys, a type-hammer operated by the movement of the hammer rock-shaft, a platen and platen-carrier, and mechanism operated by the type-hammer for advancing the platen-carrier, substantially as described.

19. In a type-writing machine, the combination of a series of keys, a corresponding series of sliding travelers operated by the movement of the keys, deflectors of varying inclinations moving with said travelers, a shaft within the range of the movement of and adapted to be turned by each of said deflectors, a type-wheel carried by said shaft, and shifting-keys for causing the endwise movement of the shaft and type-wheel, substantially as described.

20. The combination of a series of keys arranged in banks, a corresponding series of sliding travelers, the travelers corresponding to the different banks of keys moving in opposite directions, deflectors moving with said travelers, a shaft within the range of the movement of and adapted to be turned by each of said deflectors, and a type-wheel carried by said shaft, substantially as described.

21. The combination, with a type-wheel B, shaft $b$, having position-plate $b^\times$, sliding traveler I', carrying a deflector, rock-shaft F, and bail $f$, of the key D', provided with cam $d^\times$, having an extended straight face $d^3$, and an impression mechanism actuated by the further movement of the key with the straight face in contact with the traveler, whereby the type-wheel is rotated and then locked in position during the operation of the impression mechanism, substantially as described.

22. The combination, with type-wheel B and its shaft $b$, of lever L, engaging said shaft, shifting-key J, having cam $j$, for operating the lever to move the shaft endwise, and means for returning the shaft and lever to their normal positions, substantially as described.

23. A platen for a type-writing machine, consisting of a single plate of metal having the surface C, forming the platen proper, bent edges $c'$ $c^2$, and ears $c^\times$, formed on the ends of one or both of the bent edges, in combination with tension and feed devices supported in said ears, substantially as described.

24. The combination, with the platen-carrier consisting of a bar M, having slotted arms $m$, of the platen consisting of the plate C, supported at its ends in said slots and having its edges inside the ends bent in the same direction and provided with ears $c^\times$, and tension and feed devices supported in said ears, substantially as described.

25. In a type-writing machine, the combination of a pawl-carrier, a sliding hammer, connections between the hammer and pawl-carrier whereby the pawl-carrier is retracted during the impression movement of the hammer, means for actuating the hammer by the movement of the keys, a feed-rack engaged by the pawl, and a spring put under tension by the movement of the hammer and operating to return the hammer to its normal position and actuate the pawl-carrier, substantially as described.

26. In a type-writing machine, the combination, with a series of keys, of a sliding hammer, a pawl and pawl-carrier, a feed-rack engaged by the pawl, a lever connecting said hammer and pawl-carrier, whereby the movement of one member operates the other, and operating mechanism actuated by the keys and connected to one of the members, substantially as described.

27. The combination, with a series of keys, of a pawl-carrier and feed-rack engaged by the pawl, hammer-slide G, having a cam-surface, connections between the pawl-carrier and hammer-slide, the hammer rock-shaft F, operated by the movement of the keys and provided with a rocker-toe engaging the cam-surface of slide G, and a spring acting upon the pawl-carrier to return the slide G and advance the pawl to engage the feed-rack, substantially as described.

28. In a type-writing machine, the combination, with a type-carrier, of a series of travelers, connections between the type-carrier and travelers whereby the movement of any one of the travelers positions the type-carrier for the operation of the desired type, and a series of keys engaging and operating said travelers by closed cams, substantially as described.

29. In a type-writing machine, the combination, with a type-carrier, of a sliding traveler, connections between the sliding traveler and type-carrier whereby the movement of the traveler positions the type-carrier for the operation of the desired type, and a key sliding in fixed guides and engaging and operating said traveler by a closed cam, substantially as described.

Philadelphia, May 10, 1889.

JACOBS W. SCHUCKERS.

Witnesses:
    JOHN J. BRADLEY,
    A. HOSBACH.